United States Patent Office 3,510,768
Patented May 5, 1970

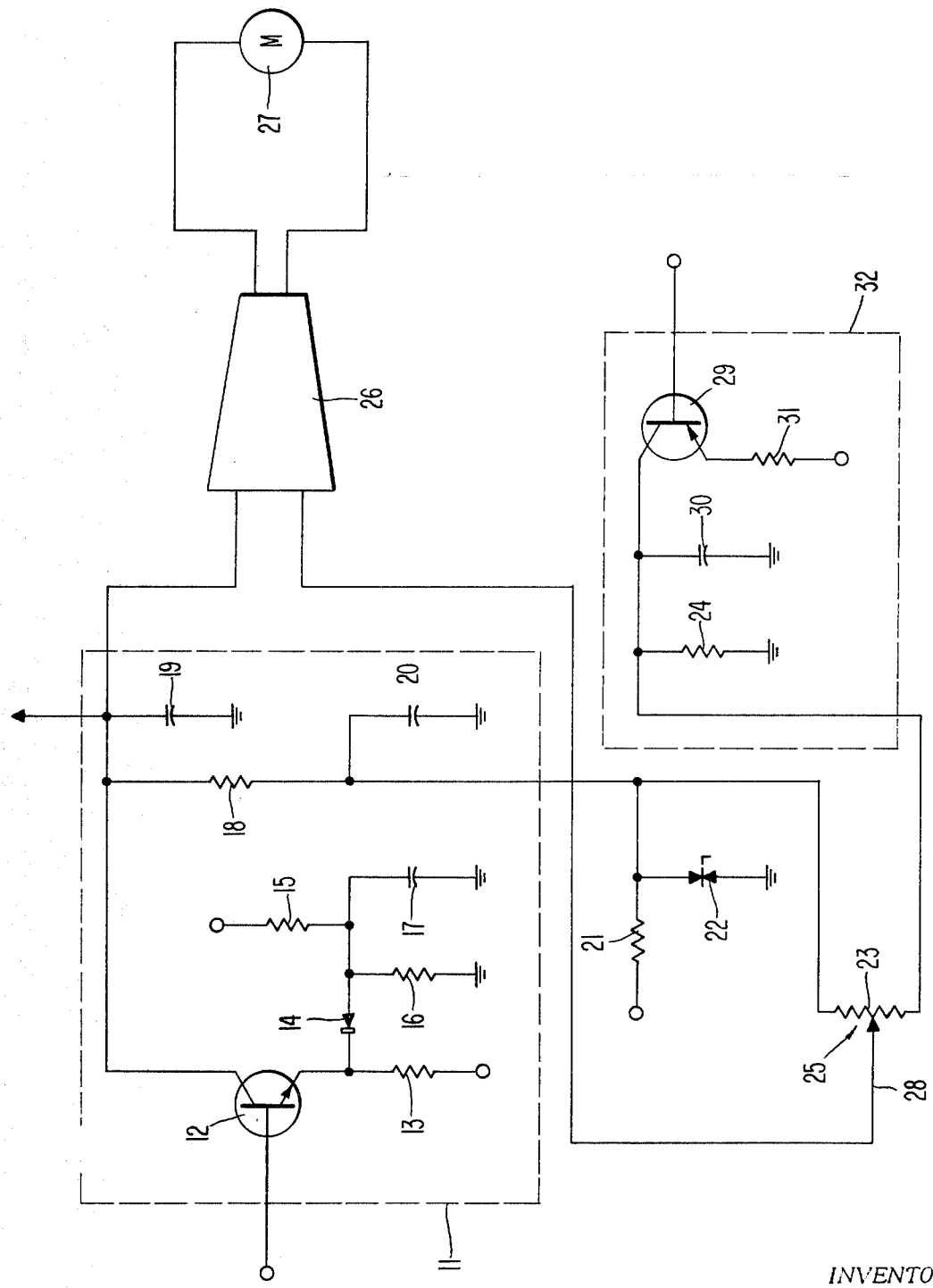

3,510,768
DUTY CYCLE RATIO METER INCLUDING A NOISE INTEGRATOR RECEIVING NOISE SIGNALS FROM A RADAR RECEIVER
David J. Petersen, Hatboro, Pa., assignor to Burroughs Corporation, Detroit, Mich., a corporation of Michigan
Filed Oct. 31, 1966, Ser. No. 590,617
Int. Cl. G01r 23/16; H04b 1/00; G01s 7/36
U.S. Cl. 324—77      11 Claims

ABSTRACT OF THE DISCLOSURE

The circuitry of the invention includes a noise integrator which receives noise signals derived from a radar receiver. A meter is responsive to the output of the noise integrator and indicates a reading corresponding to the duty cycle ratio of the input to the noise integrator. This ratio is the ratio of the time that noise is received by the noise integrator to the time when the noise integrator is permitted to receive noise. At certain times, the input of the noise integrator is inhibited and a compensating network is activated. The compensating network affects the circuitry so that the meter indication does not change during the time that the noise integrator is inhibited.

---

This invention relates to a noise meter, and, more particularly, to a noise meter for measuring the true average output of a radar quantizer due to radar receiver thermal noise.

Radar receiver output in a typical radar system comprises receiver thermal noise, noise due to clutter, and target information. Therefore, processing such an output involves the obvious problem of distinguishing between target information and noise whether it be receiver noise or noise due to clutter. Thus, where target return signal strength is so weak as to make the target signals normally indistinguishable from receiver noise or noise due to clutter, it has been found desirable to provide apparatus which detects targets by a process based on statistical methods. Such an apparatus is described in patent application, Ser. No. 470,740 filed on July 9, 1965 by Charles P. Halsted for "Radar Video Processor and Clutter Eliminator."

In such a statistical radar processing apparatus it is evident that if the amount of radar receiver thermal noise that is actually processed is known and controlled, then, much of the target information normally lost among receiver thermal noise can be extracted.

The means by which the amount of radar receiver thermal noise actually processed is measurable and maintainable at a known amount forms the subject matter of this invention.

In carrying out the present invention the video output of a radar receiver is coupled to a quantizer which provides as an output a pulse or "one" each time the receiver video exceeds a predetermined or set level. If it is known that the radar system is being operated for a time when there are no targets or clutter causing cloud formations within the scan area, the video output from the radar receiver is then known to be all receiver thermal noise. The fixed percentage of noise permitted to be processed is then easily determinable by setting the level at which the quantizer responds so that the ratio of "ones" from the quantizer to the ratio of "ones" that it could provide corresponds to the percentage of noise permitted to be processed. Stated another way, if the level at which the quantizer responds to provide a "one" is so set as to cause the duty cycle of the quantizer to be a fixed percentage of cycle time available, for example, ten percent, then it is known that all the "ones" being stored for processing are attributable to radar receiver noise. Therefore, the amount of radar receiver thermal noise which is permitted to be processed is limited to ten percent.

If, however, the quantizer is set to pass only ten percent noise of the receiver, clutter noise caused by cloud formations which to the quantizer is indistiguishable from radar receiver thermal noise, will also pass thereby providing ten percent noise for processing but a misleading ten percent because a certain percentage thereof is now attributable to clutter. When targets are being detected on a statistical basis, such a false percentage of noise may provide erroneous target information.

Of course, the input to the noise meter may be inhibited during these times of clutter but if this is done, the receiver noise normally present during the inhibit time will also be inhibited and not taken into account as part of the true average value. If the level of the video at which the quantizer is set to respond is varied in accordance with the desired percentage of the average value of noise to the input of the noise meter, then during inhibit time this level will be changed when such change is not desired and when what is desired, is to maintain the percentage of the average value previous to inhibit time the same during inhibit time so that when the radar scanning element leaves the area of clutter, the average value is still at the desired processing level.

Therefore, the general purpose of the present invention is to measure the average output of a radar quantizer due to receiver noise. To accomplish this, the present invention utilizes a noise meter wherein means are provided to compensate for inhibit time of the noise meter due to clutter or high density return areas where the return signals are known not to be noise. Known previous methods for measuring the true average output of a radar quantizer due to receiver noise have utilized ratio meters or the like utilizing direct integration of the quantizer output which needless to say, ignored inhibit times and therefore failed to give a true average value.

The present invention contemplates a noise meter for measuring the average value of the output of a radar quantizer. The output of the radar qantizer is applied to a noise integrator where it is integrated and applied to one side of a differential amplifier. The wiper arm of a potentiometer supplies the second input to the differential amplifier. For any given value of the integrated output from the quantizer the wiper arm is adjusted until the inputs to the differential amplifier are balanced. The position of the wiper arm of the potentiometer (the potentiometer may be calibrated) provides an indication of the average value of the output of the noise integrator. However, the input to the noise integrator is inhibited during receiver dead time and also during clutter time when the quantizer output is known not to be due to receiver noise. Otherwise, the output from the noise integrator would include this apparent noise and become an erroneous average value. At the same time, it is desirable to maintain the differential amplifier balanced during the inhibit time so that extended clutter will not influence the noise meter reading when the radar system resumes normal operation in a clutter free environment.

Therefore, the present invention provides a noise meter having an output indicative of the ratio of the "ones" from a radar quantizer to possible "ones" from the quantizer.

It is also an object of the present invention to provide a noise meter for measuring the true average value of the output from a radar quantizer due to thermal noise.

It is another object of the present invention to provide a noise meter for measuring the true average value of the output from a radar quantizer wherein the input to the meter is inhibited during certain no noise times without changing the reading the meter would normally have had had there been no necessity for such inhibition.

A further object of the present invention is to provide a noise meter with means for balancing the noise meter at a predetermined percentage of radar receiver noise wherein the meter will not become unbalanced during those times when the input to the noise meter is inhibited.

Other objects and many of the attendant advantages of the present invention will become more apparent with reading the following description in conjunction with the drawing wherein:

FIG. 1 illustrates in schematic form, a preferred embodiment of the present invention.

Referring now more particularly to FIG. 1 there is shown a noise integrator 11. The noise integrator 11 comprises a transistor 12. A source of negative voltage, for example, —30 volts, is connected to the emitter of the transistor 12 through a resistor 13. A source of positive voltage, for example, +3 volts, is connected to the emitter of the transistor via a resistor 15 and a diode 14. One end of the resistor 15 is connected to ground via parallelly connected resistor 16 and capacitor 17. The capacitor 17 is a de-coupling capacitance.

The resistors 13, 16, 15 the diode 14 and the positive voltage source function as a biasing network so that when the base of the transistor 12 which is normally at zero volts is raised to, for example, +3 volts, the transistor 12 is turned on. One end of a resistor 18 is connected to the collector of the transistor 12. A capacitor 19 is connected between ground and the collector of the transistor 12. The resistor 18 and the capacitor 19 together form an integrating network which causes the collector of the transistor 12 to provide as an output a voltage proportional to the average value of the input applied to the base of transistor 12.

The base of the transistor 12 receives its input from a radar quantizer which is coupled to receive the output of a radar receiver. The quantizer may be set to respond and provide a pulse or a "one" each time the radar output of the radar receiver exceeds a predetermined level. The voltage pulses therefore appearing on the base of the transistor 12 are a series of randomly occurring positive pulses. Thus, the voltage on the collector of the transistor 12 as well as the current flow through resistor 18 is a function of the average value of the input pulses from the radar quantizer.

The other end of the resistor 18 is connected via a de-coupling capacitor 20 to ground and also to a reference voltage. The reference voltage to which the resistor 18 is connected may be simply a voltage source. In the present embodiment the reference voltage is provided by means of a resistor 21 connected at one end to ground through a Zener diode 22. A source of positive voltage, for example, 15 volts, is connected to the other end of the resistor 21.

The common junction of the resistor 21 and Zener diode 22 is connected as shown through resistor 23 and resistor 24 to ground. The resistor 23 forms the resistance element of a potentiometer 25. A differential amplifier 26 has its two output terminals connected to a meter 27. The differential amplifier 26 is conventional and provides an output only when its two inputs are unequal. In such a case, the meter 27 shows an imbalance. The differential amplifier 26 receives one of its inputs from the collector of the transistor 12. The other input is provided by the wiper arm 28 of the potentiometer 25. Thus, if the voltage on the collector of the transistor 12 is not equal to the voltage on the wiper arm 28 of the potentiometer 25, the differential amplifier 26, becomes unbalanced and this imbalance shows on the meter 27 by an off-center indication.

The apparatus thus far described may function per se as a noise meter. In the absence of target reflections or reflections due to clutter the entire output of the radar receiver is due to receiver noise. Thus, when this receiver noise exceeds a predetermined level, the quantizer provides a pulse or a "one" as an output. The quantizer may be set to pass a predetermined percentage of the radar receiver noise. In other words, the percentage of the available time that the quantizer is in the "one" state may be determined.

The percentage noise passed by the quantizer in the form of "ones" may be measured by noting the position of the wiper arm on the potentiometer, which may be calibrated, at which the meter 27 is balanced and provides a "zero" reading. Thus, if the quantizer is passing ten percent noise, the position of the wiper arm 28 of potentiometer 25 which causes the meter to be balanced reads ten percent. If the percentage noise passed by the quantizer increases or decreases, the inputs to the differential amplifier 26 will be of different values causing the meter 27 to become unbalanced. When this occurs the wiper arm 28 is moved relative to the resistor 23 until the meter 27 is again balanced. The position of the wiper arm 28 with respect to resistor 23 then indicates the percentage of noise.

Now during radar receiver dead time and also during known non-noise times the input to the transistor 12 from the quantizer is inhibited. This is done to prevent an erroneous noise measure or to put it another way, to prevent dead time and non-receiver noise from being taken into account. However, during this inhibit time the average value of the input to the transistor 12 decreases the input to one side of the differential amplifier. This results in an imbalance of the meter 27. However, to change the position of the wiper arm 28 thereby to rebalance the meter results in an erroneous indication of receiver noise because normal receiver noise occurring during the inhibit time is also excluded from the noise meter.

Therefore, it is necessary to provide a means to maintain the meter 27 balanced even though one of the inputs to the differential amplifier 26 is decreased as a result of inhibiting quantizer input to the noise meter during clutter. In other words, the voltage on the wiper arm 28 must be caused to decrease an amount equivalent to the decrease in voltage at the collector of the transistor 12 during inhibit time without changing the position of wiper arm 28 relative to resistor 23. This is accomplished by decreasing the voltage drop across the resistor 23 of potentiometer 25 an amount proportional to the voltage decrease at the collector of the transistor 12.

Radar receiver dead time, that is, the time that the receiver is turned off, for example, during the transmission of radar pulses, is in any particular radar ranging situation a constant. Thus, for purposes of understanding the present invention, receiver dead time may be disregarded, bearing in mind only the present invention makes it possible to take such dead time into account.

A compensation network 32 is used to provide the appropriate decrease voltage across the resistance 23.

The compensating network 32 is essentially similar to the noise integrator circuit 11. In other words, it comprises a transistor which is turned on during the time the input to the transistor 12 is inhibited. The output of the compensating network 32 is a voltage proportional to the average value of the inhibit pulses applied as an input to the compensating network. Thus, when the transistor 12 is turned off by an inhibit pulse and its collector voltage decreased, the voltage on the wiper arm 28 is decreased an equivalent amount since the output of the compensating network 32 causes the voltage across the resistor 23 to decrease proportionally. More precisely, the compensating network 32 comprises a transistor 29. The collector of the transistor 29 is connected to the resistor 23 of potentiometer 25 as shown. A capacitor 30 connects the collector of the transistor 29 to ground and forms with the resistor 24 an integrating circuit. When the input to the base of the transistor 12 is inhibited, the base of the transistor 29 is provided with a voltage to cause the transistor 29 to conduct during the times when the transistor 12 is prevented from conducting. When the transistor 29 is conducting, voltage is applied to the emitter via a resistor 31. The output then on the collector of the transistor 29 is a voltage which is the average value of the input to the base thereof.

The values of the various components and voltages associated with the transistor 29 are so chosen that the output voltage on the collector of the transistor 29 is effectively a function of the time that the transistor 29 is conductive. Thus, if the transistor 29 is conductive 100% of the time (which means the transistor 12 is not conductive 100% of the time), the voltage drop across the resistor 23 is zero. Thus, the two inputs to the differential amplifier 26 are equal and there is no imbalance shown on the meter 27. Accordingly, if the transistor 29 is conductive 50% of the time the voltage drop across the resistor 23 is appropriately decreased so that the differential amplifier 26 sees a balanced input. Naturally if there is no inhibiting of the transistor 12, the transistor 29 remain non-conductive and the voltage drop across resistor 23 remains fixed. In this case, the noise integrator 11, differential amplifier 26 and potentiometer 25 function as a straight-forward noise meter whereby the position of the wiper arm 28 relative to the resistor 23 which causes the differential amplifier to be balanced is an indication of percentage noise.

In actual practice the inhibiting voltage applied to the base of transistor 12 is not necessarily the same as the voltage applied to the base of the transistor 29. For example, the polarities of the voltages may be different and in such a case, an inverting transistor may be interposed between the base of transistor 29 and the input representative of the inhibit pulse.

While the present invention has thus far been characterized as a noise meter, it should be noted that the disclosed combination of the compensation circuit with the noise integrator and meter is a ratio meter. Balance is indicative of the ratio betwen the duty cycle at the normal (noise) input and one minus the duty cycle at the reference (inhibit) input.

What is claim is:

1. A circuit for measuring radar receiver noise received intermittently from a quantizer, comprising in combination:
   meter means having first and second input terminals,
   said meter means indicating a first condition when the inputs at said first and second input terminals are equal and a different condition when the inputs at said first and second input terminals are unequal,
   first means having an input responsive to the output of said quantizer and connected to said first input terminal for providing a voltage proportional to the average value of the input to said first means,
   and second means connected to said second input terminal for changing the input at said second input terminal so that it is equal to the input at said first input terminal for a particular output of said quantizer and so that it is not equal to the input at said first input terminal for a different output of said quantizer, and causing said meter means to provide the appropriate indication of one of said conditions during each time period the signal from said quantizer is present and to retain said appropriate indication during the time no signal from the quantizer is present.

2. A circuit according to claim 1 wherein said second means comprises:
   a potentiometer including,
   a resistor,
   a wiper arm on said resistor connected to said second input terminal,
   a source of reference potential connected to one end of said resistor,
   whereby the position of said wiper arm on said resistor is an indication of the magnitude of the input at said second input terminal.

3. A circuit according to claim 1 wherein said second means comprises:
   circuit means connected to said second input terminal decreasing the input thereto the amount the input to said first input terminal decreases when said first means is not receiving an input.

4. A circuit according to claim 2 wherein said second means further comprises:
   circuit means connected to the end of said resistor decreasing the voltage across said resistor an amount proportional to the amount the input at said first input terminal decreases during the time no signal from said quantizer is present, the input to said circuit means being intermittent so that it is activated during the time when no signal from said quantizer is present and is not activated during the time when the signal from said quantizer is present.

5. A circuit according to claim 1 wherein said meter means comprises:
   a differential amplifier,
   a meter connected to the differential amplier providing an indication when the inputs to said differential amplifier are unequal.

6. A circuit according to claim 1 wherein said first means comprises:
   a transistor having its collector connected to said first input terminal,
   integrating means connected to the collector causing the collector voltage to be the average value of the input at the base of the transitor.

7. A circuit according to claim 6 wherein said second means comprises:
   a potentiometer including,
   a resistor,
   a wiper arm on said resistor connected to said second input terminal,
   a source of reference potential connected to one end of said resistor,
   whereby the position of said wiper arm on said resistor is an indication of the magnitude of the input at said second input terminal.

8. A circuit according to claim 6 wherein said second means further comprises:
   circuit means connected to the end of said resistor decreasing the voltage across said resistor an amount proportional to the amount the input at said first input terminal decreases during the time no signal from said quantizer is present, the input to said circuit means being intermittent so that it is activated during the time when no signal from said quantizer is present and is not activated during the time when the signal from said quantizer is present.

9. A circuit according to claim 7 wherein said second means further comprises:
   circuit means connected to the end of said resistor decreasing the voltage across said resistor an amount proportional to the amount the input at said first input terminal decreases during the time no signal from said quantizer is present, the input to said circuit means being intermittent so that it is activated during the time when no signal from said quantizer is present and is not activated during the time when the signal from said quantizer is present.

10. A circuit according to claim 2 wherein said source of reference potential is a voltage dividing network comprising a Zener diode in series with a second resistor, one end of said Zener diode being connected to said one end of said potentiometer resistor.

11. A circuit according to claim 9 wherein said source of reference potential is a voltage dividing network comprising a Zener diode in series with a second resistor, one end of said Zener diode being connected to said one end of said potentiometer resistor.

References Cited

UNITED STATES PATENTS 3,122,704  2/1964  Jones.
3,382,435  5/1968  Bockholt.

FOREIGN PATENTS 986,207  8/1964  Great Britain.

E. E. KUBASIEWICZ, Primary Examiner

U.S. Cl. X.R.

325—363; 343—17.7